(12) United States Patent
Barnet et al.

(10) Patent No.: US 7,310,561 B2
(45) Date of Patent: Dec. 18, 2007

(54) IDENTIFYING CRITICAL OPERATIONS OF A PRODUCTION PROCESS

(75) Inventors: Sonja Barnet, Viernheim (DE); Hans-Juergen Biegler, Schwetzingen (DE); Thomas Engelmann, Palo Alto, CA (US); Matthias Gressler, Wiesloch (DE); Thorsten Kulick, Bensheim-Schoenberg (DE); Bernhard Lokowandt, Heidelberg (DE); Thomas Schulz, Speyer (DE)

(73) Assignee: SAP AG, Walldorf (DE)

( * ) Notice: Subject to any disclaimer, the term of this patent is extended or adjusted under 35 U.S.C. 154(b) by 128 days.

(21) Appl. No.: 11/094,776

(22) Filed: Mar. 30, 2005

(65) Prior Publication Data

US 2006/0184263 A1    Aug. 17, 2006

(30) Foreign Application Priority Data

Feb. 14, 2005    (DE) ...................... 10 2005 006 608

(51) Int. Cl.
*G06F 19/00* (2006.01)
(52) U.S. Cl. ........................... 700/100; 700/103; 705/8
(58) Field of Classification Search ................ 700/100, 700/99, 102, 103; 705/8
See application file for complete search history.

(56) References Cited

U.S. PATENT DOCUMENTS

| | | | |
|---|---|---|---|
| 5,040,123 A * | 8/1991 | Barber et al. | 700/100 |
| 5,787,000 A * | 7/1998 | Lilly et al. | 700/100 |
| 7,039,595 B1 * | 5/2006 | Lilly et al. | 705/8 |
| 2006/0026052 A1 * | 2/2006 | Klett et al. | 705/8 |

FOREIGN PATENT DOCUMENTS

| | | |
|---|---|---|
| EP | 0 488 246 A2 | 6/1992 |
| EP | 0 679 972 A1 | 11/1995 |

OTHER PUBLICATIONS

Steigerwald,"Software Features Quality Subsystem", Modern Machine Shop, vol. 76, Issue 7, Dec. 2003, p. 159.*
Linner, A., "Rechnereinsatz in der Produktionsplanung und -steuerung: Computer application in production planning and production control," Elektronische Rechenanlagen, vol. 27, No. 3, pp. 148-152, 154-156, Jun. 1985, Munich, Germany, XP000715987 (English abstract included).
Communication of Apr. 4, 2007 in corresponding European application 05 006 845.1-1527.
Werkstattsteuerung per Bildschirm, Computerwoche.de-Archive 1977/7, pp. 1-2, (Feb. 11, 1977). (D3) XP-001152229 (with English language translation).
Communication Oriented Information and Control System, German Wikipedia, pp. 1-5, downloaded Apr. 04, 2007. (D4) XP-001152230 (with English language translation).
Letter of Jun. 18, 2007 from European Associate.

* cited by examiner

*Primary Examiner*—Leo Picard
*Assistant Examiner*—Steven R. Garland
(74) *Attorney, Agent, or Firm*—Fish & Richardson P.C.

(57) ABSTRACT

Identifying an operation that is critical to meeting a due date of a production order includes identifying operations associated with the production order, obtaining schedules for the operations using infinite production planning, obtaining start intervals for the operations based on the schedules, selecting a target operation from the operations, and determining whether the target operation is critical to meeting the due date based on whether the target operation can be scheduled, using finite production planning, in a start interval obtained for the target operation.

20 Claims, 8 Drawing Sheets

IDENTIFYING CRITICAL OPERATIONS OF A PRODUCTION PROCESS

CLAIM TO PRIORITY

This patent application claims priority to German Patent Application DE102005006608.9, filed on Feb. 11, 2005, the contents of which are hereby incorporated by reference into this application as if set forth herein in full.

TECHNICAL FIELD

This patent application relates generally to identifying an operation of a production process that is critical to meeting a due date of a production order.

BACKGROUND

Producers today face volatile markets, decreasing customer commitments, mass production, and shorter product life cycles. In response, producers have turned to flexible production planning and supply chain management (SCM).

Generally speaking, SCM encompasses cross-company coordination and optimization of material, information, and value within a value creation chain. One goal of SCM is to provide customers with products at agreed-upon due dates at relatively low cost. This goal can be achieved if production planning enables producers to plan delivery due dates relatively precisely. Different factors, however, may impact the ability to plan delivery due dates precisely. For example, different operations may be required to satisfy a production order. These operations may depend on the availability of different resources, and it may be difficult to ascertain the availability of those resources.

As noted above, production processes may include different operations, examples of which include, but are not limited to, processing steps, transportation of products between locations, manufacturing intermediate products, and assembling intermediate products into end products. Different operations can depend on each other, creating a network of dependencies. In order to provide production planning in such an environment, SCM includes enterprise resource planning (ERP) software, which provides planning and optimizing tools. One example of such software, the Advanced Planner and Optimizer (APO) from SAP® AG, facilitates planning and detailed scheduling of operations needed to satisfy productions orders. APO may use data from demand planning and supply network planning utilities in order to plan operations based on availability of resources.

Production planning software such as APO, however, is not currently configured to identify critical operations of a production process. A "critical" operation, in this context, is an operation that acts as a bottleneck or an interruption in the production process if it is not performed according to specific parameters (e.g., at a specific time). As a result, production planners need to examine production processes manually in order to determine which operation(s) are critical to meeting the due date of a production order.

SUMMARY

This application features methods, systems, and apparatus, including computer program products, for identifying an operation of a production process that is critical to meeting a due date of a production order. Aspects thereof are set forth below.

In general, in one aspect, the invention is directed to identifying an operation that is critical to meeting a due date of a production order. This aspect includes identifying operations associated with the production order, obtaining schedules for the operations using infinite production planning, obtaining start intervals for the operations based on the schedules, selecting a target operation from the operations, and determining whether the target operation is critical to meeting the due date based on whether the target operation can be scheduled, using finite production planning, in a start interval obtained for the target operation. Other aspects may include one or more of the following features.

The foregoing aspect may include scheduling an operation that occurs after the target operation using infinite production planning. Determining whether the target operation is critical to meeting the due date may include determining whether the production order meets the due date. Obtaining the schedules may include backward scheduling the operations from the due date to obtain latest start times for the operations, and/or forward scheduling the operations from a predefined time to obtain earliest start times for the operations. Obtaining the start intervals may include, for each operation, comparing an earliest start time to a latest start time.

Infinite production planning may include scheduling operations without taking availability of resources into account. Finite production planning may include scheduling operations while taking availability of resources into account.

The foregoing aspect may include selecting a second target operation from the operations, and determining whether the second target operation is critical to meeting the due date. The foregoing aspect may include increasing times for operations other than the target operation to obtain a reduced start interval for the target operation. Determining whether the target operation is critical may include determining if the target operation can be scheduled in the reduced start interval. The foregoing aspect may include selecting at least one other operation, and determining if the at least one other operation can be scheduled in a start interval for the at least one other operation.

The foregoing aspect may include increasing the times of the operations after determining whether the target operation is critical, and continuing to increase the times of the operations until the start interval reaches a predetermined threshold. The foregoing aspect may include specifying a threshold value for use in identifying a critical operation. The threshold value may be used in determining whether the target operation is critical.

The target operation may be determined to be non-critical if the target operation can be scheduled in the start interval. The target operation may be determined to be critical if the target operation cannot be scheduled in the start interval.

The details of one or more examples are set forth in the accompanying drawings and the description below. Further features, aspects, and advantages of the invention will become apparent from the description, the drawings, and the claims.

DESCRIPTION OF THE DRAWINGS

Like reference numerals denote like elements in the figures.

DETAILED DESCRIPTION

Figure 1A:
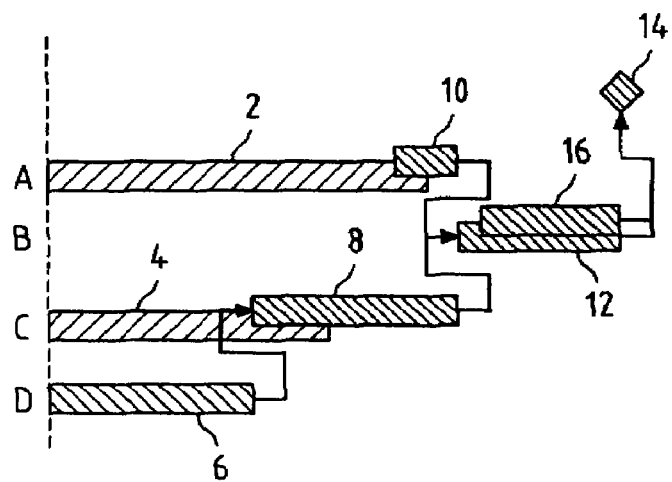
FIG. 1A is a graph depicting infinite production planning.

In order to ensure customer satisfaction, production orders must be filled on time. Production orders can be characterized by the operations that they necessitate, and by the time that those operations require to satisfy the production orders. During automated production planning, multiple production orders can be accepted. Processes needed to satisfy these production orders should be scheduled so that the orders are satisfied on time. Because different production orders may require the same resources, certain resources may be over-committed. For example, if two operations attempt to access the same resource, the capacity of the resource may not be sufficient to perform both operations at the same time. One operation can take precedence at the expense of the other operation. The capacity of a resource can thus be one possible constraint during production planning. Examples of other types of constraints are described in the following.

Generally speaking, assigning a resource to an operation requires that the resource be also available at a particular time. Only if enough of the resource is available, can an operation be planned for that resource. For example, machines have certain operational times and down times. These times dictate when a resource may have machine access. Thus, operations can be assigned a resource at fixed times, which may not change.

Resources can be divided into blocks. Blocks may include time slots in which a resource can only produce products with certain characteristics. An operation can only be planned within such a block if the operation is to produce such a product.

Resources may be linked. For example, an end point of a first resource can initiate a starting point of second resource. Waiting times between these, or any other, resources may be defined. For example, there may be minimum and maximum waiting times.

Oftentimes, machines need to be supplied with specific tools needed to manufacture a certain product. Incorporating the tools into the machine may take time. This so-called "tooling-time" may need to be taken into account during production planning. Tooling-times may be different for different successions of operations.

The foregoing are but a few constraints considered in production planning processes. Additional constraints also may be considered, if applicable.

There are different types of production planning processes currently in use. Among these are finite production planning and infinite production planning.

In infinite production planning, resources are planned for all production orders without considering whether the resources required to satisfy those production orders are available, or whether other timing constraints are met. For example, if two operations require the same resource at the same time, this information is not taken into account during infinite production planning. By contrast, finite production planning takes into account capacity and availability of resources when scheduling resources for a production order. Finite production planning can thus be used to determine whether a production plan is executable. However, as explained in more detail below, finite production planning does not identify critical operations of a production process.

FIG. 1A illustrates a production plan implemented using infinite production planning. Four different resources A, B, C, and D are shown. Use of resources A to D by operations 2, 4, 6, 8, 10, 12, 16 is depicted along a time axis. Each block represents one operation. The length of a block represents the duration of the corresponding operation. Operations 2, 4 are for a first production order. Operations 6, 8, 10, 12 and 16 are for a second production order. A due date 14 for the second production order is also shown.

As shown in FIG. 1A, resource A is used by operation 2. At the end of operation 2, operation 10 also uses resource A. There is an overlap time during which both operations 2 and 10 use resource A. Resource B is used by both operations 12 and 16. Operations 12 and 16 overlap on resource B. Resource C is used by operation 4. At the end of operation 4, there is an overlap time during which both operations 4 and 8 use resource C. Resource D is used by operation 6.

Because the production plan of FIG. 1A is generated by infinite production planning, it is not possible to determine whether operations can be performed on a resource. More specifically, in infinite production planning, no checks are performed to determine if two operations use the same resource at the same time.

Figure 1B:
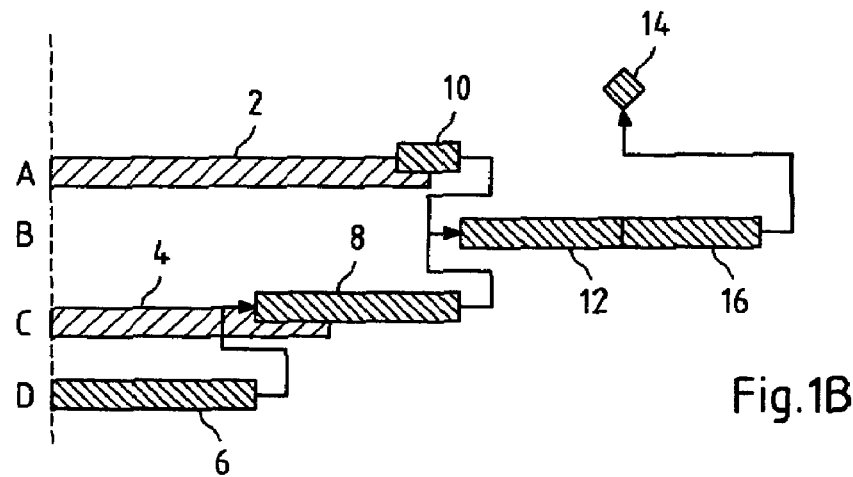
FIG. 1B is a graph depicting infinite production planning with sequence planning.

FIG. 1B shows an infinite production planning process that take into account a sequence of operations associated with one production order. Thus, operation 8 may only start after operation 6 is finished, and operation 12 may only start after operations 8 and 10 are finished. However, operations 2 and 10, and 4 and 8, may overlap.

In finite production planning, it is possible to determine whether a resource is available for a particular operation, and to schedule the resource accordingly. Finite production planning thus provides a production plan that is actually executable. However, the duration of a production plan created by finite production planning is not optimized. Several operations could be rescheduled to obtain shorter delivery times, however, it is not possible to automatically determine which operations which can be rescheduled.

During finite production planning, it is checked whether a resource is available. There can be various constraints that may limit availability of the resource. One constraint may be the capacity of the resource. Capacity constraints can be that all plans, part lists, and intermediate products need to be available, consistent, and complete for production. All necessary tools may also need to be available, along with personnel with any required qualifications. One disadvantage of finite production planning is that it may schedule production so that an a production order is satisfied after its agreed-upon due date.

Figure 2:
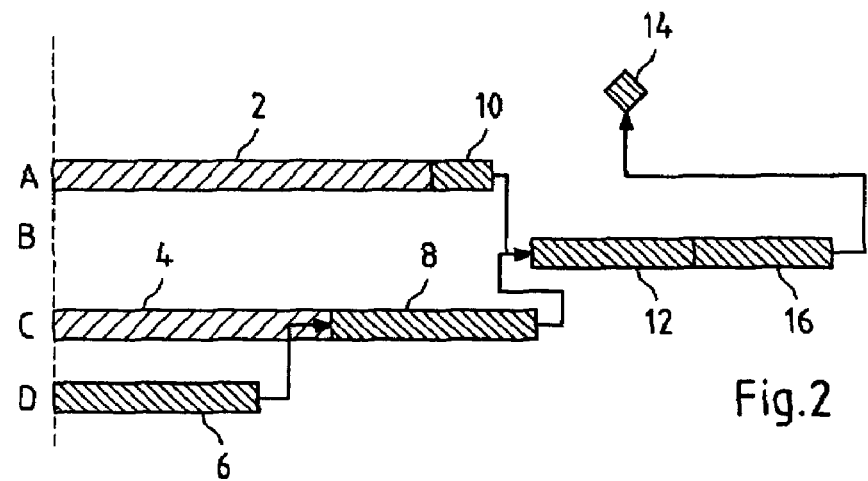
FIG. 2 is a graph depicting finite production planning.

FIG. 2 illustrates a production plan implemented using finite production planning. Resource A is used by operation 2 first. Only after performing operation 2 can resource A be used by operation 10. Resource C is used by operation 4, and can only be used by operation 8 after operation 4 is performed. Resource B is used first by operation 12 and then by operation 16. Because operation 16 is the last operation in a production order, and it is finished after due date 14, this production order is not satisfied on time.

Thus, to provide efficient production planning, to reduce lead-times, to increase throughput of products, and to reduce inventory cost, production planning needs to take into account capacity of resources. However, as explained above, finite production planning may lead to production orders that are not satisfied on time. With infinite production planning, on-time schedules can be obtained. But, those schedules are unrealistic due to physical limitations of the resources involved.

Figure 3:
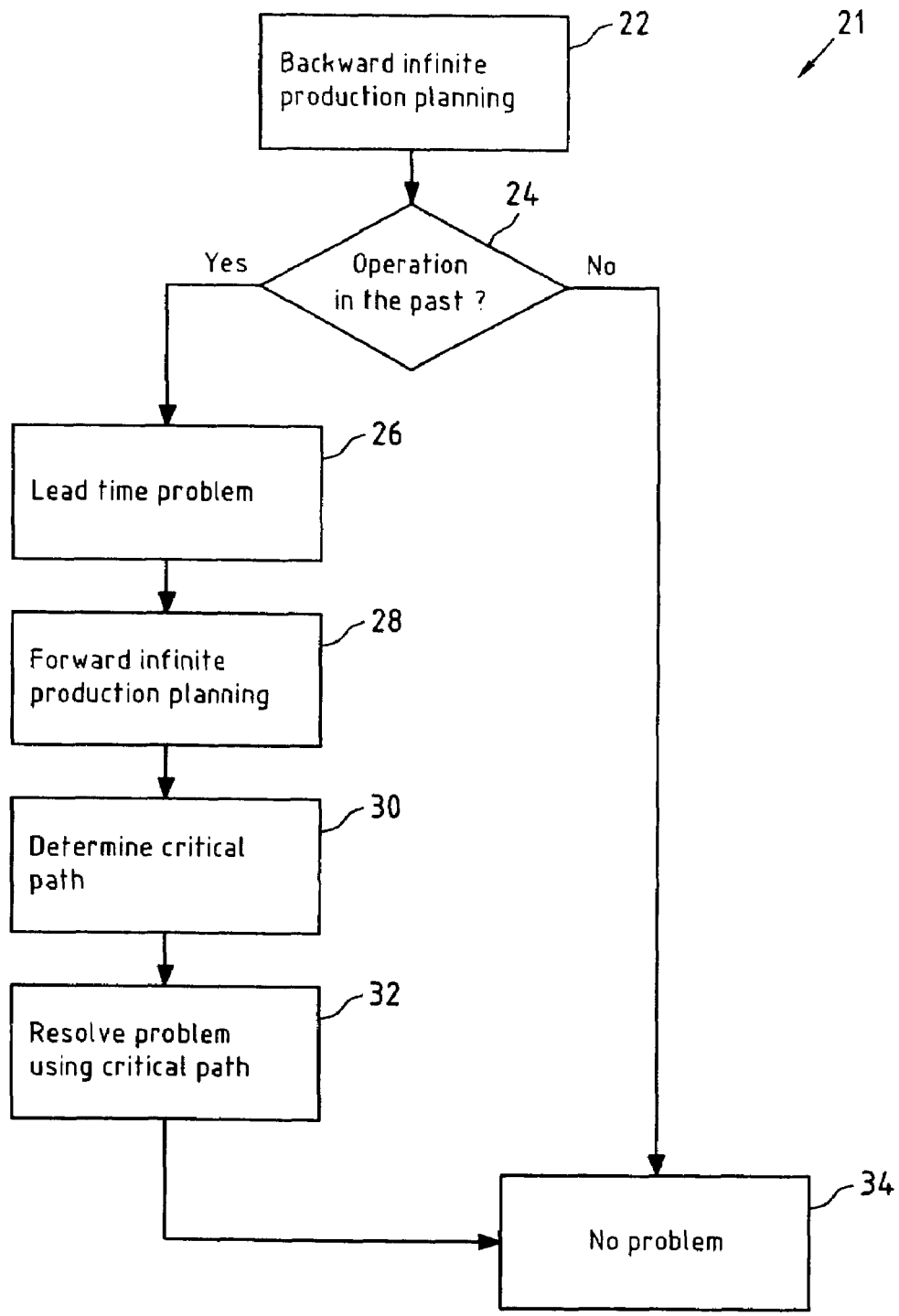
FIG. 3 a flowchart of a process for detecting a lead-time problem in an infinite production planning process.

FIG. 3 shows an infinite production planning process for use in detecting whether there is a lead-time problem, meaning whether there is insufficient time in a schedule to satisfy a production order. Process 21 plans (22) operations of a production order using infinite production planning backwards, starting from the date that the production order is due, i.e., the due date. After planning, process 21 determines (24) if one operation in the resulting schedule is before the current time (i.e., in the past). If no operation is in the past, then there is no lead-time problem (34). Backward infinite production planning of the operations permits identification of the latest start point for each of the operation. The latest start point is the latest point in time at which an operation can be started and still meet the production order due date. These latest start points are stored in memory.

If the latest start time of one operation is in the past, there is a lead-time problem (26) with the schedule. The lead time problem means that more time is required, than is available, to finish all operations in sequence in order to satisfy the production order.

When a lead-time problem occurs, process 21 schedules (28) all operations using infinite production planning from the current time (start point) forward (meaning into the future). With "forward" infinite production planning, earliest start points of operations can be identified. The earliest start point is the point in time at which an operation can begin after start of production. The earliest start points are stored in memory.

Process 21 determines, for each operation, whether the earliest start points are different from the latest start points. If the earliest and latest start points for an operation are different, then the operation is considered to be flexible in terms scheduling. Shifting the start times of operations such as these may not affect the due date.

Process 21 designates (30) all operations with fixed start points (i.e., the same earliest and latest dates) as being on a critical path of the production order. Shifting (32) the termination of one or more operations on a critical path may resolve the lead-time problems so that, in the end, the production order is satisfied (34) on time.

Figure 4A:
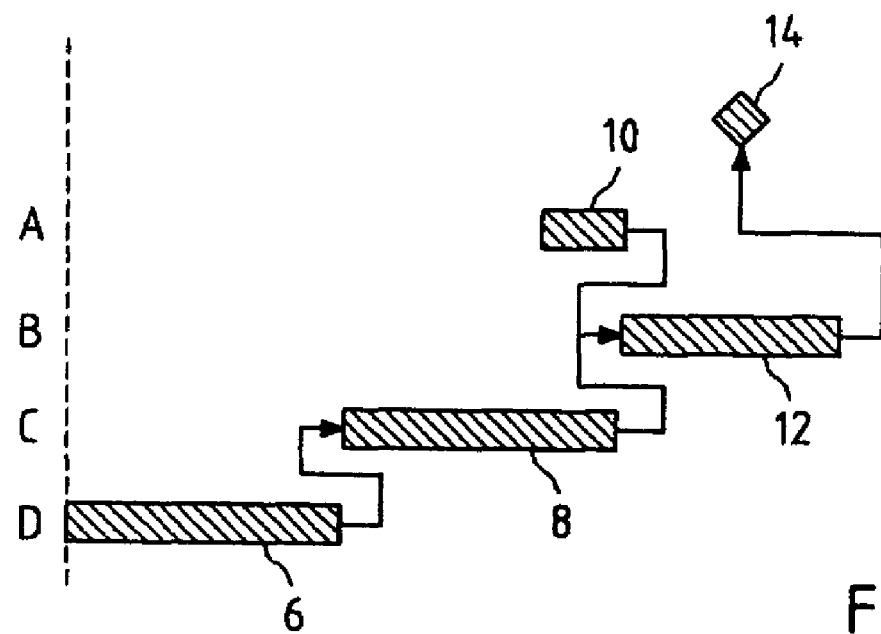
FIG. 4A is a graph depicting production planning with a lead-time problem.

FIG. 4A illustrates a lead-time problem graphically. In FIG. 4A, operations 6, 8, 10, 12 are scheduled using infinite production planning with sequence planning. As shown in FIG. 4A, operation 12 is finished after due date 14. This means that the lead-time of the production order is longer than the time available to satisfy the production order. Process 21 may be used to identify operations that are critical in terms of the lead-time.

Figure 4B:
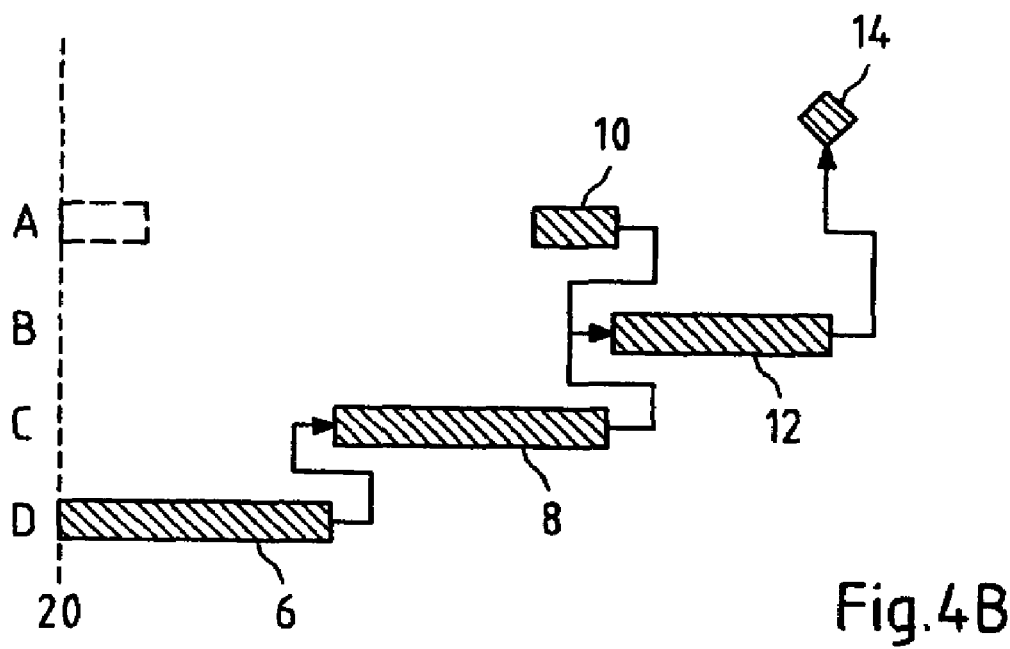
FIG. 4B is a graph depicting production planning with a critical path.

More specifically, after scheduling operations 6, 8, 10, 12 backwards from due date 14 with infinite production planning, the start time of operation 6 dictates a starting point 20, as shown in FIG. 4B. From the starting point 20, all operations are planned forward using infinite production planning. This enables identification of the earliest start points for operations 6, 8, 10, 12. As shown in FIG. 4B, the earliest and latest start points of operation 10 differ. (Operation 10 is illustrated as solid block when started at its latest start point and as a dotted block when started at its earliest start point.) All other operations 6, 8, 12 cannot be shifted and have fixed start points. Therefore, these operations constitute the critical path. Changes in the schedule of operations that are on the critical path have a direct affect on the time that it will take to satisfy the production order, as noted above.

However, identifying lead-time problems and resolving those problems only on critical paths does not take into account capacity problems of resources A to D. In this regard, changes on the critical paths may lead to overlaps with other production orders on resources A to D. Also, shortening durations of operations on critical paths might not lead to satisfying the production order earlier, since some operations that are not on the critical paths may be constrained to start only after a capacity problem with a resource has been resolved. Such a problem on such a resource may lead to a delay in satisfying the production order even though the operation was not on the critical path. For this reason, identifying critical paths in a finite production plan might not result in identification of operations that are, in fact, responsible for delays in satisfying the production order.

Figure 5:
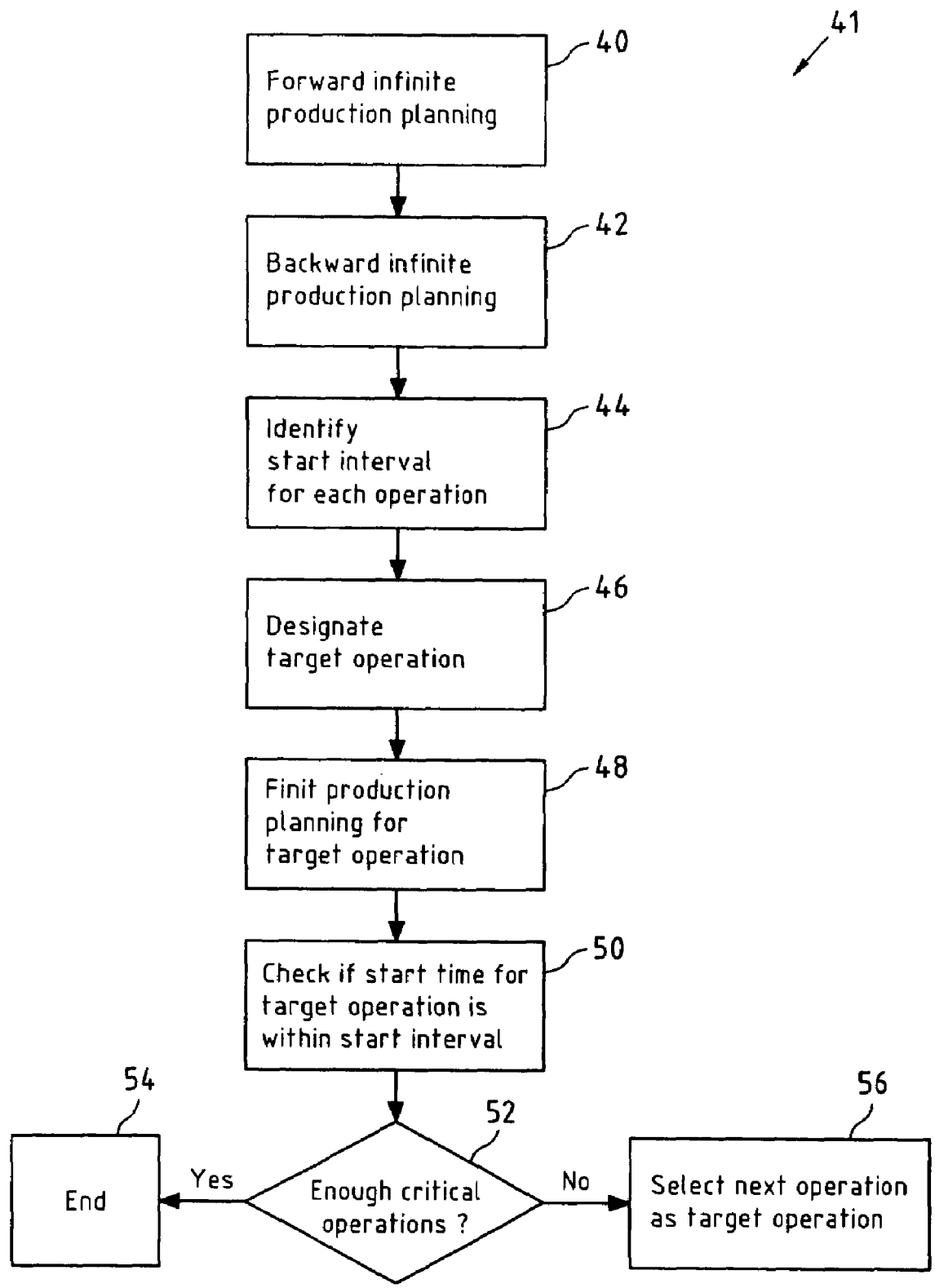
FIG. 5 a flowchart of a process for detecting critical operations in production.

FIG. 5 shows a process 41 for identifying critical operations taking infinite and finite production planning into account. From a starting point, which may be the current time, process 41 schedules (40) operations of a production order using forward infinite production planning. The earliest start points of the operations are identified from the resulting schedule, and stored. Also, starting from the due date, process 41 schedules (42) operations of the production order using backward infinite production planning. The latest start points of the operations are identified from the resulting schedule, and stored.

After identifying the earliest start times and the latest start times of the operations, process 41 identifies (44) a start interval each of the operations. The start interval is the time between the earliest start time and the latest start time of an operation.

Figure 6A:
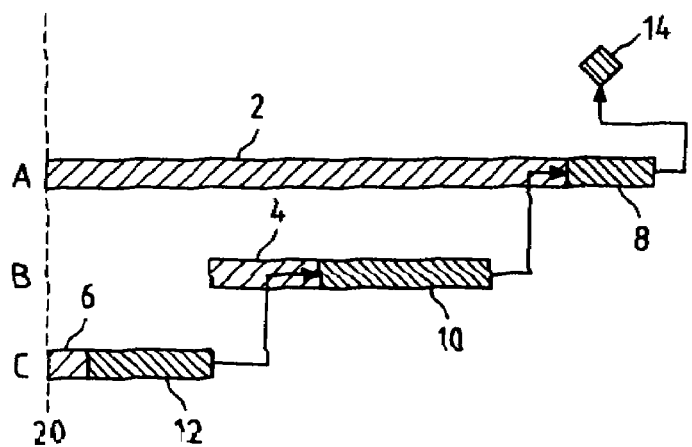
FIG. 6A is a graph depicting production planning using two production orders and three operations for a production order.

FIG. 6A shows two production orders, which include three operations 2, 4, 6 and 8, 10, 12. In FIG. 6A, there are capacity constraints on each of the resources A, B, and C. Operation 12 can only be started after operation 6 is finished due to limited capacity on resource C. Operation 10 can only be started after operation 4 is finished due to limited capacity on resource B. Operation 8 can only be started after operation 2 is finished due to limited capacity on resource A. Thus, the schedule of FIG. 6A does not meet due date 14.

Figure 6B:
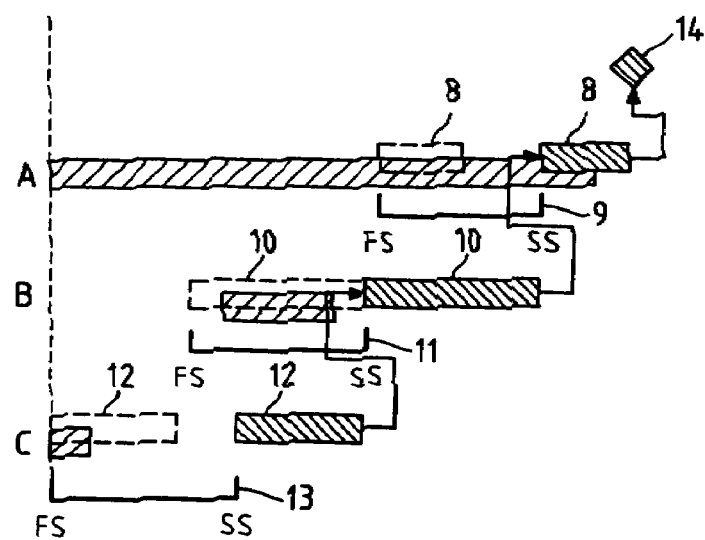
FIG. 6B is a graph depicting production planning with start intervals.

FIG. 6B illustrates the same operations as in FIG. 6A. First, operations 12, 10, 8 are scheduled using forward infinite production planning starting from start point 20. This results in the dotted blocks for operations 8, 10, 12. As a result, the earliest possible start points of operations 8, 10, 12 can be identified from FIG. 6B. Then, operations 8, 10, 12 are scheduled using backward infinite production planning beginning at due date 14. This results in the solid blocks for operations 8, 10, 12. As a result, the latest possible start points of operations 8, 10, 12 can be identified from FIG. 6B For each operation, the time interval between the earliest start time and the latest start time is the start interval. For operation 8, this is start interval 9; for operation 10, this is start interval 11; and for operation 12, this is start interval 13. These start intervals are obtained without taking into account resource capacity problems/limitations.

Returning to FIG. 5, after process 41 identifies (44) start intervals 9, 11, 13, process 44 designates one operation to be the target operation. For this target operation, process 41 executes (48) finite production planning starting from the operation's start point. Process 41 determines (50) whether, with finite production planning, the target operation can be started within a previously determined start interval. If not, the target operation is identified as critical. Otherwise, the target operation is identified as non-critical.

Process 41 determines (52) if the number of critical operations meets (or exceeds) a predetermined threshold. If so, process 41 does not designate any further target operations. If not, process 41 designates (56) another target operation and proceeds as described above with respect to the newly-designated target operation.

Figure 6C:
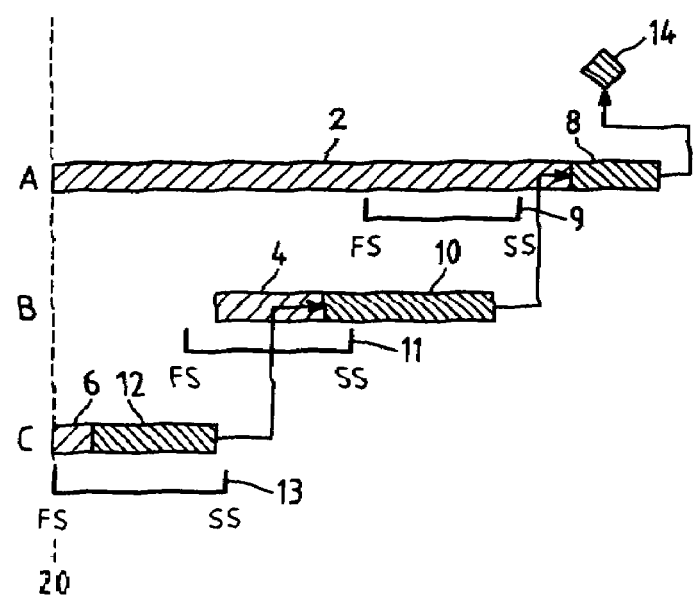
FIG. 6C is a graph depicting production planning that uses infinite production planning to detect a critical operation in production.

FIG. 6C illustrates, graphically, a process for determining whether, using finite production planning, target operations can be started in their corresponding start intervals. As shown, operation 12 can be started in its start interval 13. Operation 10 can also be started in its start interval 11. Operation 8 cannot be started within its start interval 9. Thus, operation 8 is identified as critical.

However, identifying operations that can be started in their respective start intervals may not necessarily make these operations non-critical. For example, two operations that result in delay of the production order can be critical even though both of those operations can be started within their corresponding start intervals.

Figure 7:
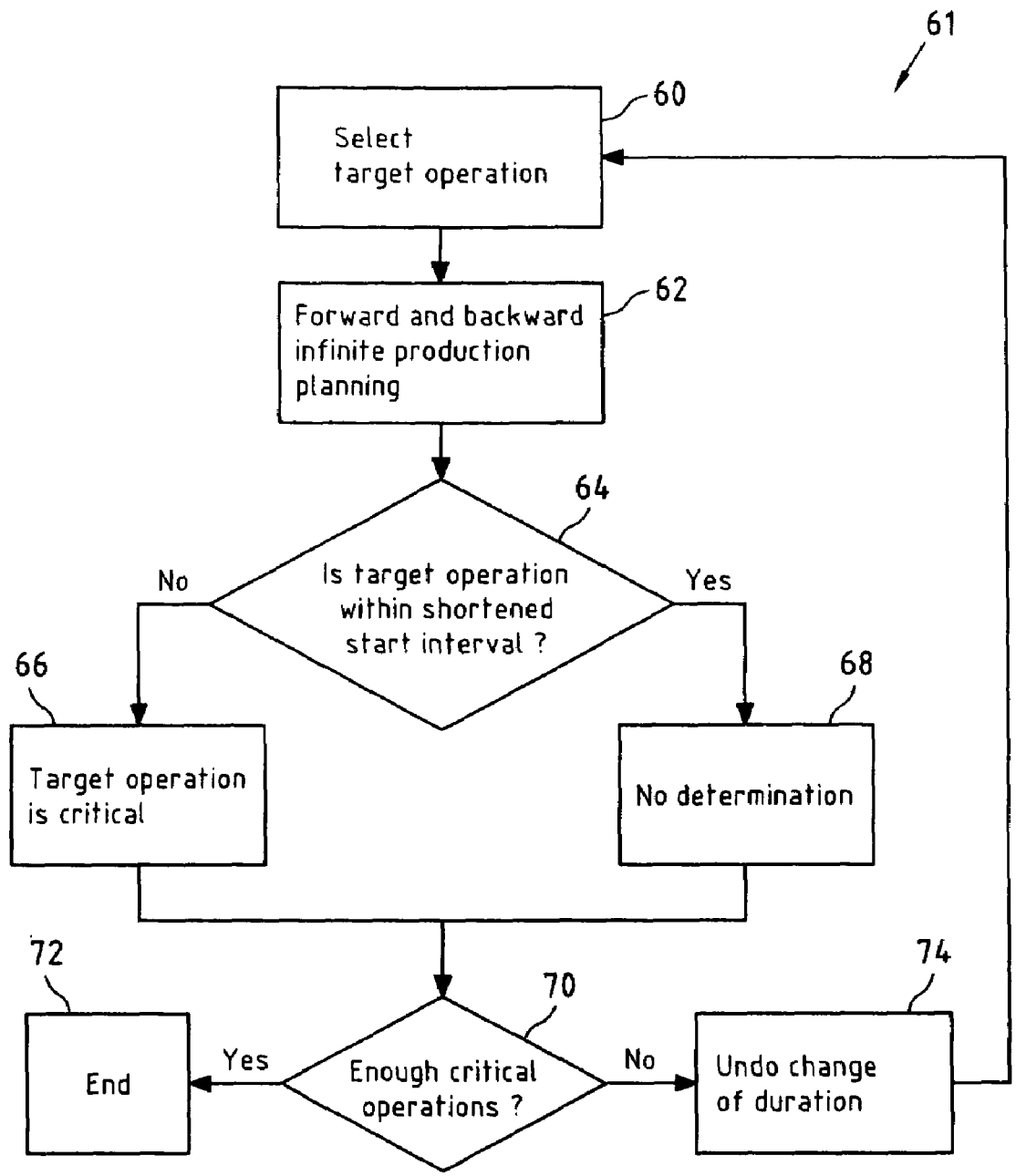
FIG. 7 a flowchart of a process for determining a shortened start interval and for detecting critical operations in production.

FIG. 7 shows a process 61 for identifying critical operations that can be started in their corresponding start intervals. Process 61 may be used to supplement processes 21 and/or 41, or it may be used independently thereof. During process 61, only operations that have not yet been deemed critical using the processes described above are analyzed. To identify operations as critical, the start interval of each such operations is shortened.

Process 61 selects (60) one operation to be the target operation. Process 61 schedules (62) all other (non-target) operations forward and backward using infinite production planning. During this scheduling (62), the durations of all operations are increased so that they are longer than actually necessary. These increases result in a new start interval for the target operation. Specifically, because the durations of the non-target operations increase, the start interval of the target operation decreases.

Process 61 schedules the target operation using finite production planning and determines (64) whether the target operation can be started in the shortened start interval. If the target operation cannot be started in the shortened start interval, the target operation is deemed critical (66). If the target operation can be started in the shortened start interval, the target operation is not necessarily deemed (68) critical or non-critical. Process 61 determines (70) whether the predetermined threshold value has been reached. If the threshold value has been reached (72), process 61 terminates. Otherwise, process 61 returns (74) the start intervals to their original durations, selects (60) another operation, and designates the selected operation as the target operation.

In the foregoing manner, each of the operations may be selected and designated as the target operation. After all operations have been selected as target operations and checked for criticality, the duration of all operations is increased and the operations are again selected as target operations, and the foregoing checking process is repeated. This process is performed until a threshold value of critical operations is obtained.

Figure 6D:
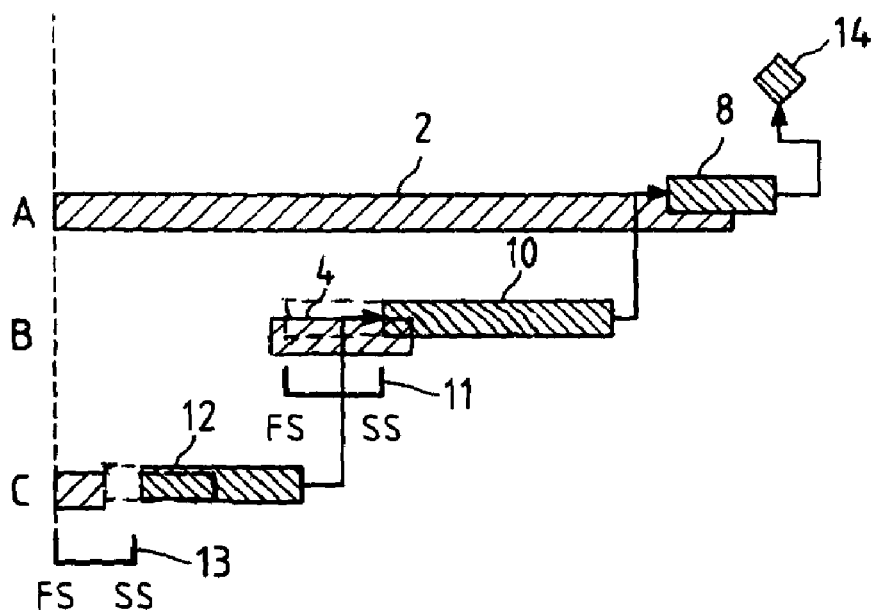
FIG. 6D is a graph depicting production planning with shortened start intervals.

FIG. 6D illustrates identifying critical operations using shortened start intervals. In FIG. 6D, operation 12 is selected and is designated as the target operation. After increasing the duration of operation 10, the earliest and latest start times of operations 10, 12 are obtained. This results in a shortened start interval 13 for operation 12. Operation 12 is scheduled using finite forward planning. It is then determined whether operation 12 can be started in the shortened start interval 13. In this case, operation 12 can be started in the shortened start interval 13, as shown in FIG. 6D.

Figure 6E:
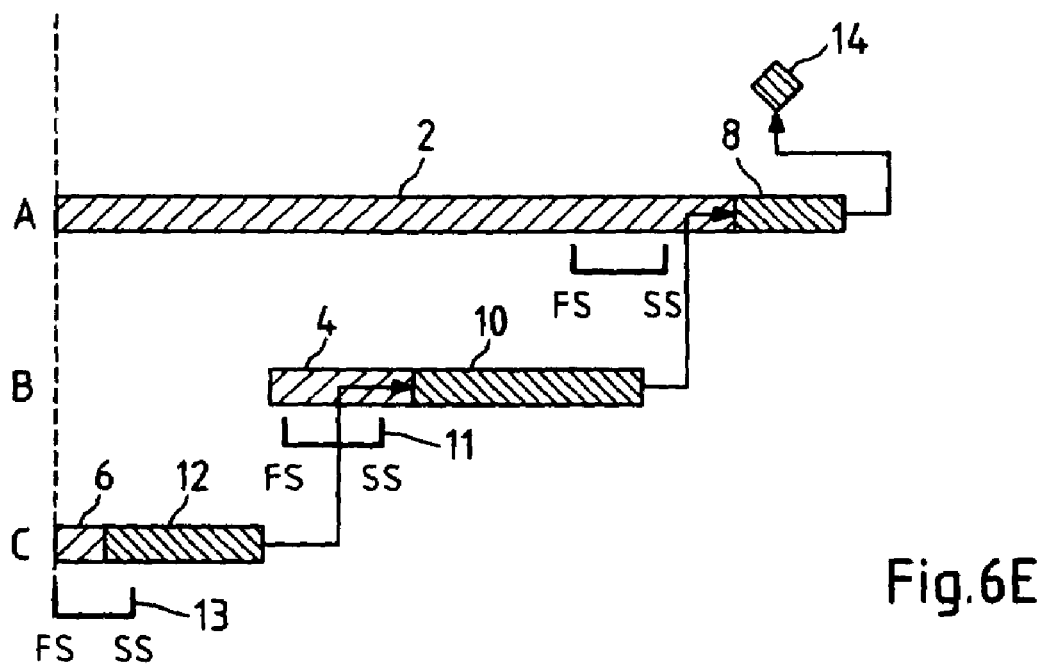
FIG. 6E is a graph depicting production that uses finite production planning to detect a critical operation.

Operation 10 is selected as the next target interval. After increasing the duration of operation 12, the earliest and latest start times of operations 10, 12 are determined. This results in a shortened start interval 11 for operation 10. After scheduling using finite production planning, as per FIG. 6E, it is checked, whether operation 10 can be started in the shortened start interval 11. As shown in FIG. 6E, operation 10 cannot be started in interval 11. Accordingly, operation 10 is deemed critical.

Figure 8:
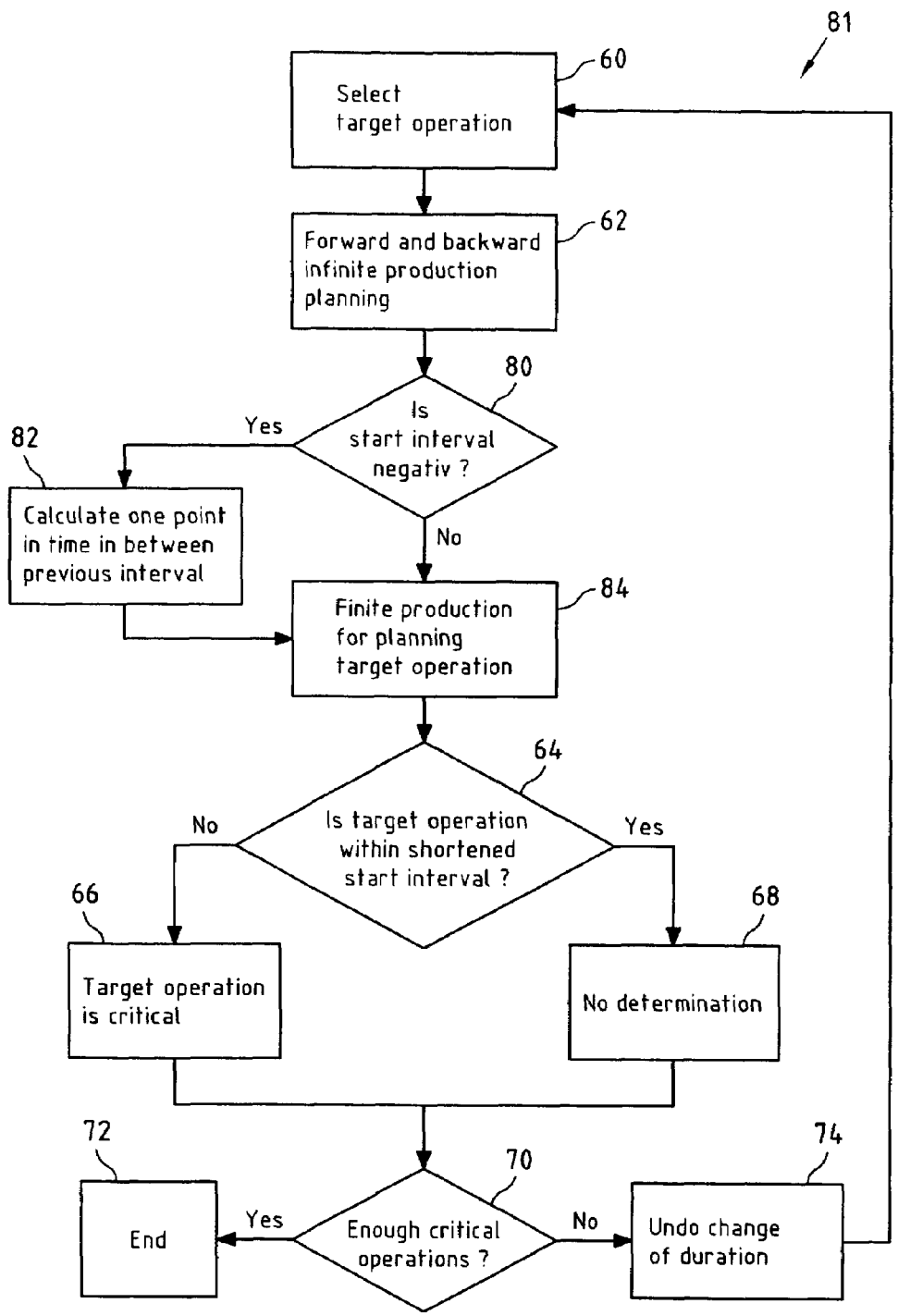
FIG. 8 a flowchart of a process for determining a shortened start interval, for detecting a negative start interval, and for detecting critical operations in production.

Should the start interval becomes negative, e.g., because of a changed duration of the operations, the earliest start point can be after the latest start point. In this case, a point in time (as opposed to an interval of time) is obtained that is between the earliest start point and the latest start point after changing the duration of the operations. FIG. 8 shows a process for doing this. The process of FIG. 8, namely process 81, may be used to supplement processes 21 and/or 41 or may be used independently thereof. In this regard, the blocks of FIG. 8 that are similar to those of FIG. 7 are not described here.

FIG. 8 illustrates reduction of a start interval to a start point. After identifying the earliest and latest start points with a changed duration, the target operation (62) is checked to determine (80) whether the start interval is negative. If the start interval is negative, a point in time in between the previous interval boundaries is selected. After selection (82), or if the start interval is not negative, the target operation is scheduled (84) with finite production planning at the beginning of the interval. If an operation can be scheduled with finite production planning at that point in time (which was determined by the increased duration of the other operations), such an operation is designated non-critical.

The processes described herein ("the processes") are not limited to use with any particular hardware and software; they may find applicability in any computing or processing environment and with any type of machine that is capable of running machine-readable instructions. All or part of the processes can be implemented in digital electronic circuitry, or in computer hardware, firmware, software, or in combinations thereof.

All or part of the processes can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the processes can be performed by one or more programmable processors executing one or more computer programs to perform the functions of the processes. The method steps can also be performed by, and the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include a processor for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

All or part of the processes can be implemented in a computing system that includes a back-end component, e.g., as a data server, or that includes a middleware component, e.g., an application server, or that includes a front-end component, e.g., a client computer having a graphical user interface, or any combination of such back-end, middleware, or front-end components. The components of the system can be interconnected by any form or medium of digital data communication, e.g., a communication network. Examples of communication networks include a LAN and a WAN, e.g., the Internet.

Method steps associated with the processes can be rearranged and/or one or more such steps can be omitted to achieve the same, or similar, results to those described herein.

Elements of different embodiments described herein may be combined to form other embodiments not specifically set forth above. Other embodiments not specifically described herein are also within the scope of the following claims.

What is claimed is:

1. A method of scheduling production using an operation that is critical to meeting a due date of a production order, the method comprising:
    identifying operations associated with the production order;
    obtaining schedules for the operations using infinite production planning;
    obtaining start intervals for the operations based on the schedules;
    selecting a target operation from the operations scheduled using infinite production planning;
    determining whether the target operation is critical to meeting the due date based on whether the target operation can be scheduled, using finite production planning, in a start interval obtained for the target operation using infinite production planning; and
    scheduling production taking into account whether the target operation is critical to meeting the due date.

2. The method of claim 1, further comprising:
    scheduling an operation that occurs after the target operation using infinite production planning;
    wherein determining whether the target operation is critical to meeting the due date further comprises determining whether the production order meets the due date.

3. The method of claim 1, further comprising:
    selecting a second target operation from the operations; and
    determining whether the second target operation is critical to meeting the due date.

4. The method of claim 1, wherein obtaining the schedules comprises backward scheduling the operations from the due date to obtain latest start times for the operations.

5. The method of claim 4, wherein obtaining the schedules comprises forward scheduling the operations from a predefined time to obtain earliest start times for the operations.

6. The method of claim 1, wherein obtaining the start intervals comprises, for each operation, comparing an earliest start time to a latest start time.

7. The method of claim 1, wherein infinite production planning comprises scheduling operations without taking availability of resources into account.

8. The method of claim 1, wherein finite production planning comprises scheduling operations while taking availability of resources into account.

9. The method of claim 1, further comprising increasing times for operations other than the target operation to obtain a reduced start interval for the target operation.

10. The method of claim 9, wherein determining whether the target operation is critical comprises determining if the target operation can be scheduled in the reduced start interval.

11. The method of claim 1, further comprising:
    selecting at least one other operation; and
    determining if the at least one other operation can be scheduled in a start interval for the at least one other operation.

12. The method of claim 1, further comprising increasing times of the operations after determining whether the target operation is critical.

13. The method of claim 12, further comprising continuing to increase the times of the operations until the start interval reaches a predetermined threshold.

14. The method of claim 1, wherein the target operation is determined to be non-critical if the target operation can be scheduled in the start interval.

15. The method of claim 1, wherein the target operation is determined to be critical if the target operation cannot be scheduled in the start interval.

16. The method of claim 1, further comprising:
    specifying a threshold value for use in identifying a critical operation;
    wherein the threshold value is used in determining whether the target operation is critical.

17. A computer program product tangibly embodied in an information carrier for scheduling production using an operation that is critical to meeting a due date of a production order, the computer program product comprising instructions that cause a machine to:
  identify operations associated with the production order;
  obtain schedules for the operations using infinite production planning;
  obtain start intervals for the operations based on the schedules;
  select a target operation from the operations scheduled using infinite production planning;
  determine whether the target operation is critical to meeting the due date based on whether the target operation can be scheduled, using finite production planning, in a start interval obtained for the target operation using infinite production planning; and
  schedule production taking into account whether the target operation is critical to meeting the due date.

18. The computer program product of claim 17, further comprising instructions that cause the machine to:
  schedule an operation that occurs after the target operation using infinite production planning;
  wherein determining whether the target operation is critical to meeting the due date further comprises determining whether the production order meets the due date.

19. The computer program product of claim 17, further comprising instructions that cause the machine to:
  select a second target operation from the operations; and
  determine whether the second target operation is critical to meeting the due date.

20. A system comprising:
  memory that stores executable instructions to for use in scheduling production using an operation that is critical to meeting a due date of a production order; and
  one or more processing devices that execute the executable instructions to:
    identify operations associated with the production order;
    obtain schedules for the operations using infinite production planning;
    obtain start intervals for the operations based on the schedules;
    select a target operation from the operations scheduled using infinite production planning;
    determine whether the target operation is critical to meeting the due date based on whether the target operation can be scheduled, using finite production planning, in a start interval obtained for the target operation using infinite production planning; and
    schedule production taking into account whether the target operation is critical to meeting the due date.

* * * * *